June 5, 1928.

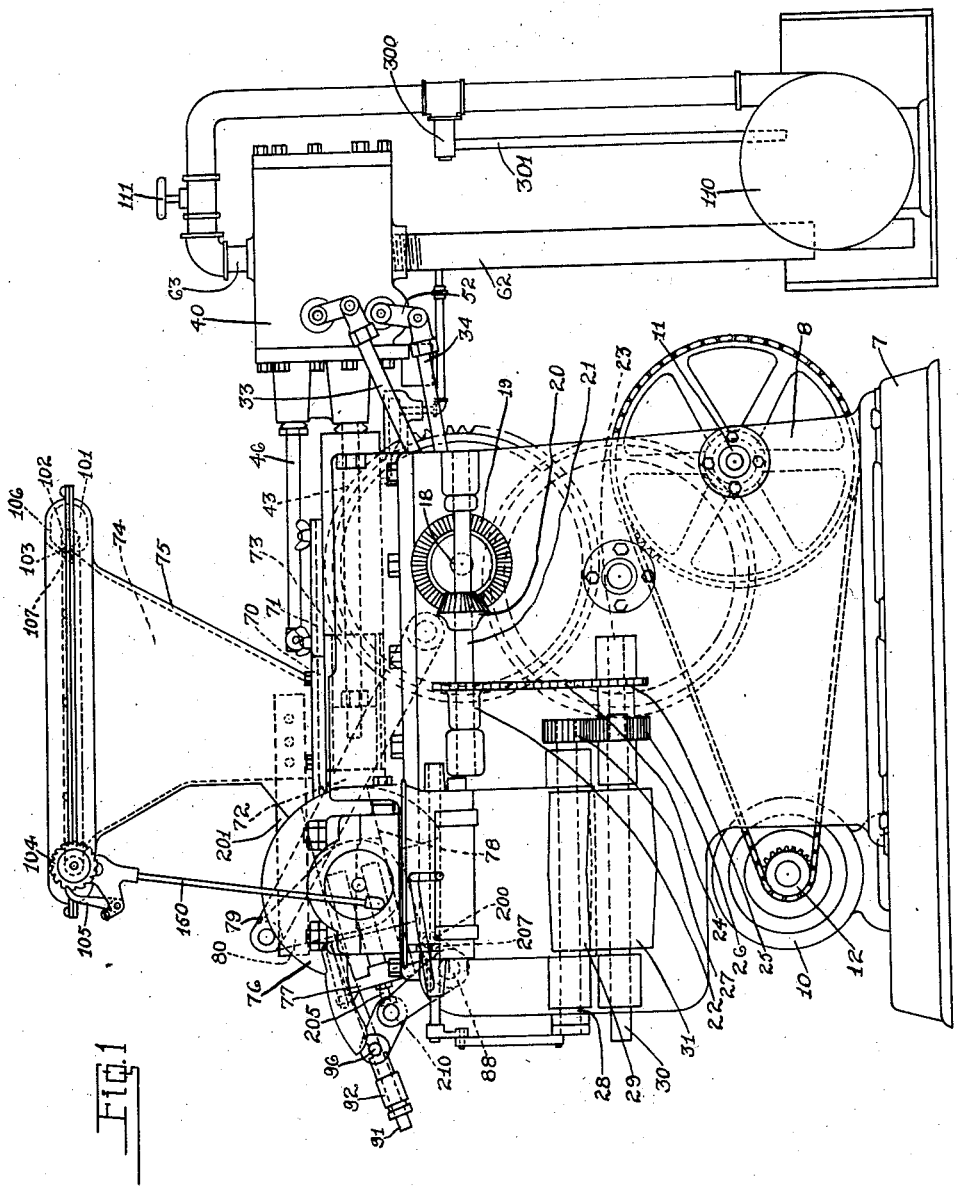

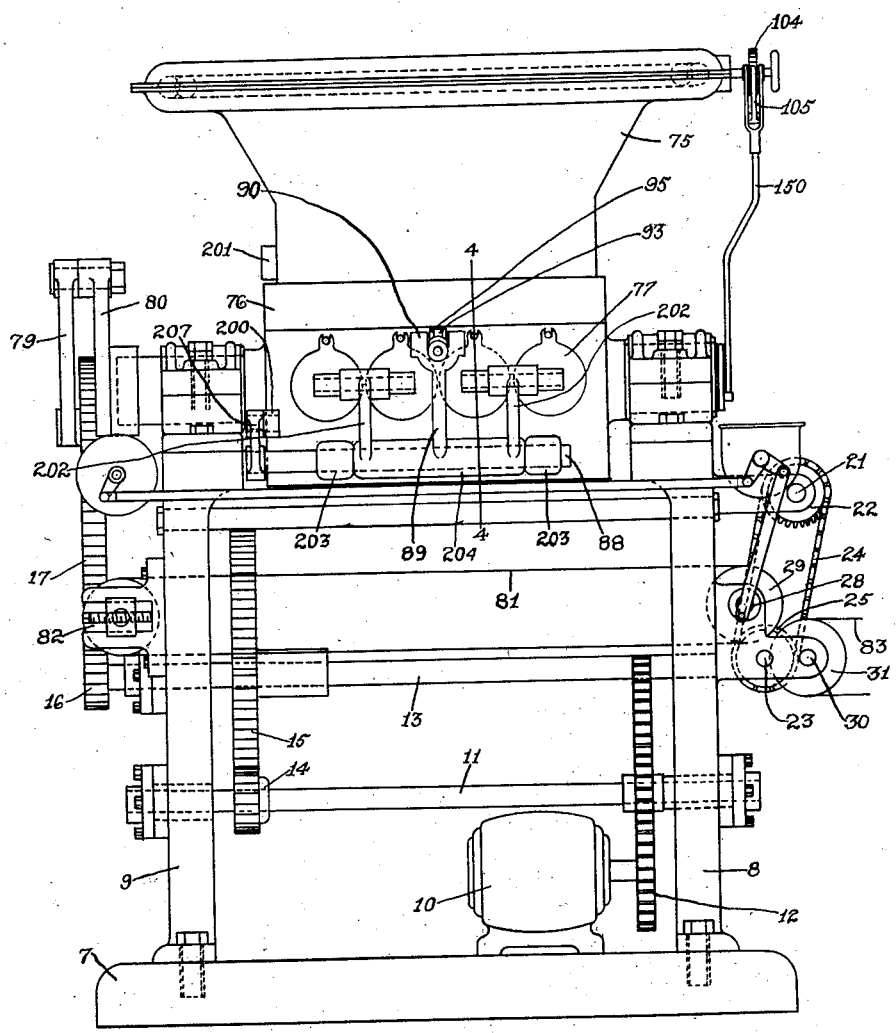

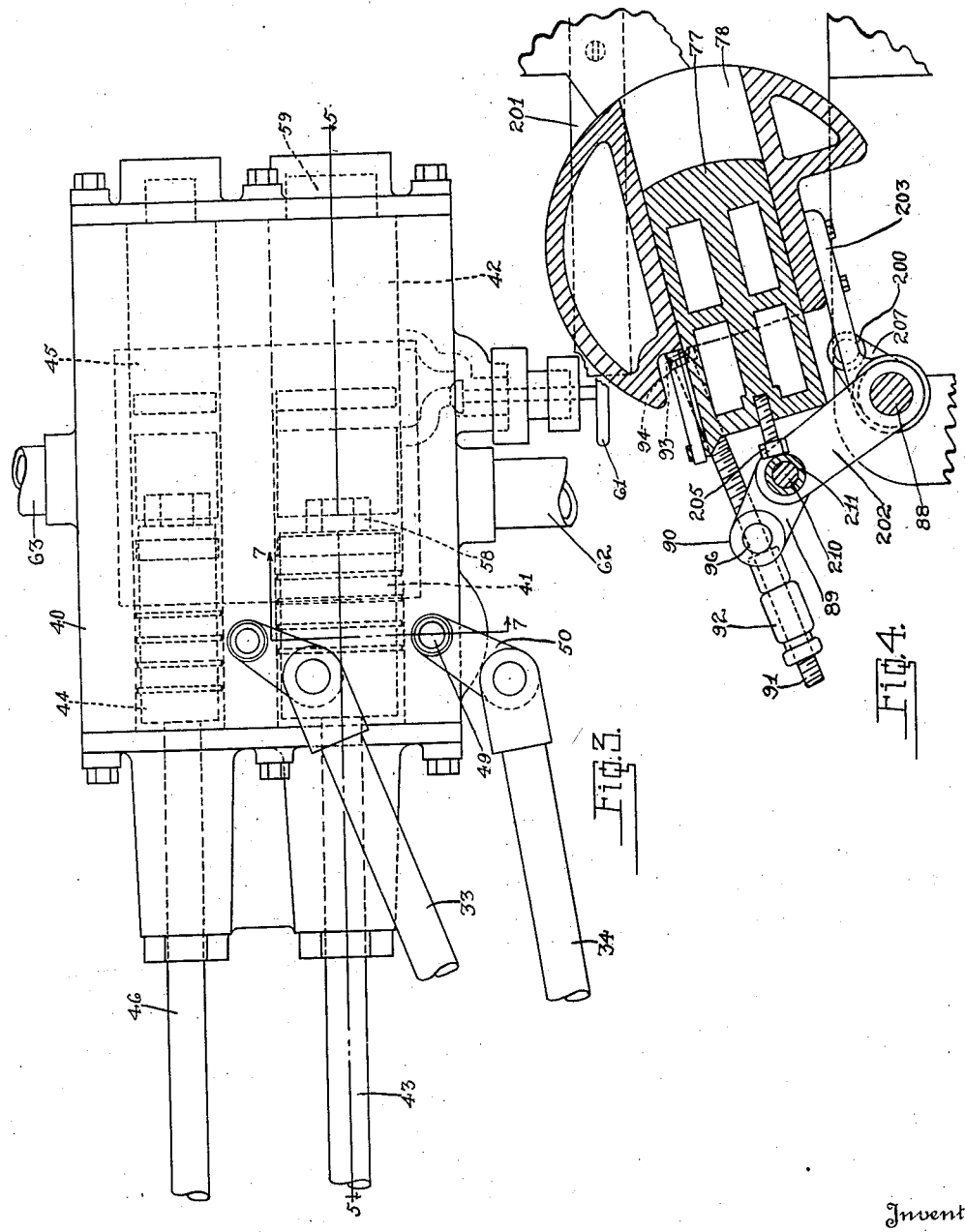

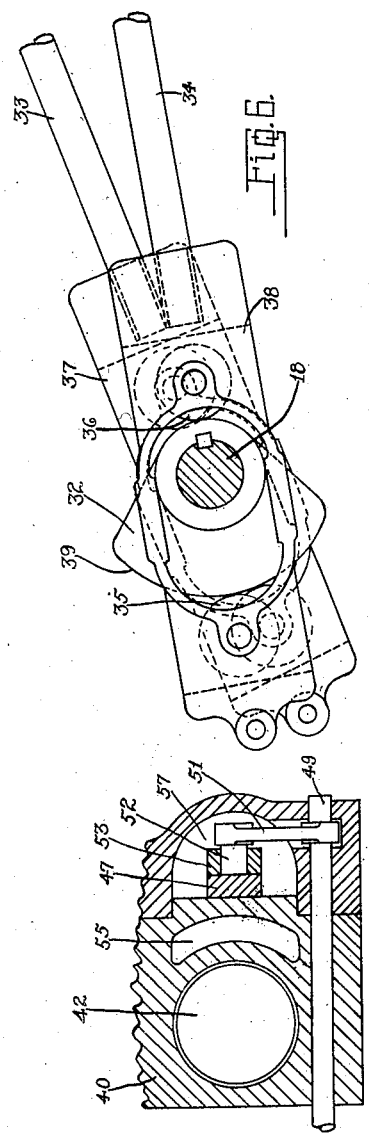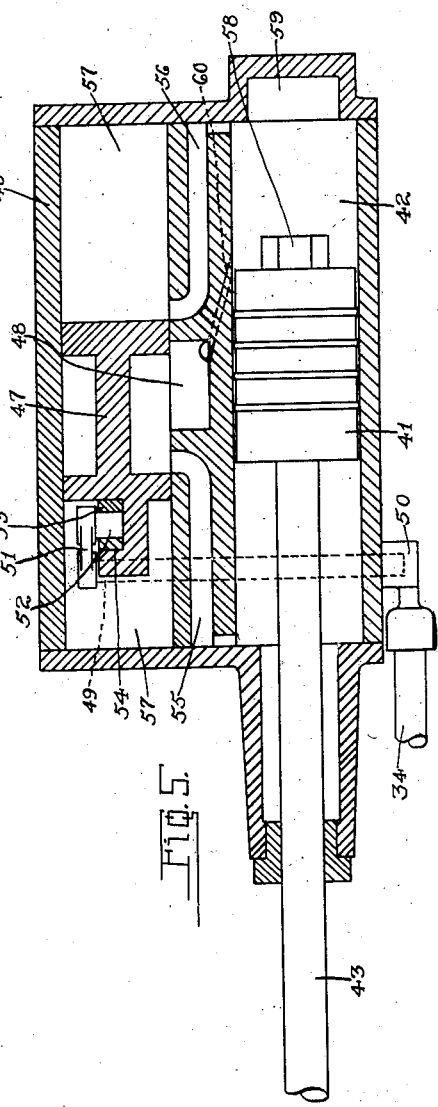

W. G. KIRCHHOFF 1,672,162

DOUGH DIVIDER

Filed Feb. 28, 1924   5 Sheets-Sheet 5

Inventor
WILLIAM G. KIRCHHOFF
By Murray & Ziegler
Attorneys

Patented June 5, 1928.

1,672,162

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

DOUGH DIVIDER.

Application filed February 28, 1924. Serial No. 695,859.

An object of my invention is to provide a simple and efficient divider for operation on plastics such as dough.

Another object of my invention is to provide a device of the class described that will automatically control and determine the maximum pressure that may be exerted upon a plastic mass upon which the device operates.

Another object of my invention is to provide a device that is compact and that requires a minimum of space and comprises a minimum of parts.

These and other objects are attained by the means described herein and disclosed in the accompanying drawings, in which:

Fig. 1 is a side elevation of a device embodying my invention.

Fig. 2 is a front elevation of a device embodying my invention.

Fig. 3 is an enlarged fragmental side elevation showing parts of the device shown in Fig. 1.

Fig. 4 is an enlarged sectional view on line 4—4 of Fig. 2.

Fig. 5 is a sectional view on line 5—5 of Fig. 3.

Fig. 6 is an enlarged fragmental detail view showing parts of a valve control mechanism, all of which form details of my invention.

Fig. 7 is a sectional view on line 7—7 of Fig. 3.

Figure 8:
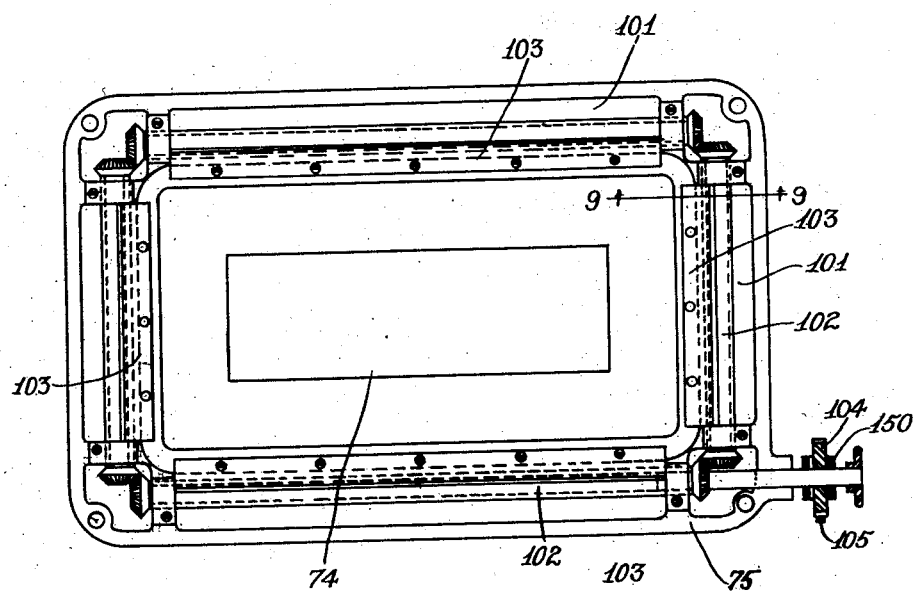
Fig. 8 is a top plan view of a hopper forming a detail of my invention.
Figure 9:
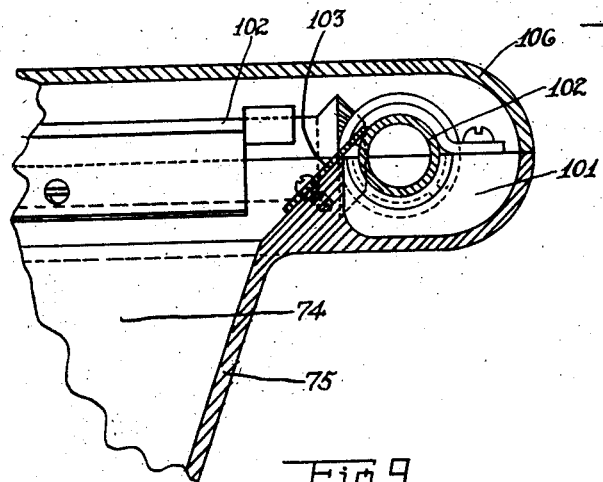
Fig. 9 is a sectional view on line 9—9 of Fig. 8.

My device comprises a base 7 supporting the spaced sides 8 and 9. The base supports a motor 10 driving a shaft 11 through a chain and sprocket mechanism 12. The shaft 11 drives a shaft 13 by way of the meshing gears 14 and 15, said shafts being rotatably supported by the sides 8 and 9. The shaft 13 extends through the side 9 and carries on its outer end a gear 16 in mesh with a gear 17 mounted on a shaft 18 extending through both sides 8 and 9. The side of the shaft extending outwardly beyond side 8 carries a bevel gear 19 driving a bevel gear 20 mounted on the shaft 21. The shaft 21 extends longitudinally of the side 8 and carries a sprocket 22 that drives a shaft 23 through a chain 24 and sprocket 25, said sprocket 25 being mounted on the shaft 23 and carrying the gear 26 that engages a gear 27 mounted on the shaft 28 carrying a roller 29. A shaft 30 parallel with the shaft 28 and disposed below and at a distance outwardly from the shaft 28 carries a roller 31 and said roller and shaft may be driven from the gear 26 or may be driven from some other source. The rollers 31 and 29 are used for supporting the belts that pass thereover as will be explained hereafter.

The shaft 18 has mounted on it cams such as 32 for actuating valve control shafts 33 and 34. By reference to Fig. 6 the structure will be more fully appreciated. The shaft 18 has mounted on it cams such as 32 that are engaged by the rollers 35 and 36 carried by the blocks 37 and 38. The block 37 carries the shaft 33 and the block 38 carries the shaft 34. The rollers abut upon the peripheries 39 of the cams wherefore as the shaft 18 is rotated the shafts 33 and 34 are actuated in conformity with the cycle established by the contour or periphery of the cams. The shafts 33 and 34 control the action of pistons contained within the cylinder 40.

The cylinder 40 has formed within it a pair of piston chambers within each of which is disposed a piston. The piston 41 contained within the chamber 42 is controlled by the shaft 34 and carries a piston rod 43 extending forwardly from the cylinder 40. The piston 44 is disposed within the chamber 45, and carries a forwardly extending piston shaft 46 disposed above and in substantial parallelism with the piston rod 43. The pistons are controlled in substantially the same way, wherefore an explanation of one will suffice. In Fig. 5 is shown a sectional view through chamber 42 containing piston 41. It will be observed that a slide valve 47 controls communication between the opposite ends of the chamber 42 with the exhaust 48. The slide valve is connected with the shaft 34 by way of a crank shaft 49, carrying at its outer end the crank 50 pivotally connected to the shaft 34. The crank shaft 49 has mounted on it a crank 51, the crank 51 being contained within the cylinder 40 and carrying a pin 52 that engages a block 53 mounted for reciprocating in a way 54 formed in the slide valve 47. From the foregoing it will be apparent that oscillatory motion applied to the shaft 49 will serve to actuate the slide valve 47, see Fig. 5, so as to alternately dispose ducts 55 and 56 in communication with the exhaust 48. The chamber 57 within which the slide valve 47 may be reciprocated, contains fluid under pressure, wherefore it will be evident, by reference to Fig. 5, that the ducts 55 and 56 will also serve to alternately admit fluid under pressure into the chamber 42 for operation upon the piston 41. Attention is called to the right hand end of the piston and chamber structure, shown in Fig. 5, from which it will be apparent that the reduced end 58 on the piston, may enter the recess 59 of the chamber 42, thereby serving as a dashpot for checking the motion of the piston. By reference to Figs. 3 and 5, it will be evident that the by-pass 60 provided between the righthand portion of chamber 42 and exhaust 48 may be brought into play for checking the forward or leftward motion of the piston 41 shown in Fig. 5. Any suitable valve mechanism 61 may be provided for controlling the flow of fluid under pressure through the by-pass 60 thereby controlling the stroke of the piston 41. There is no by-pass provided for the piston and chamber associated with the piston 44 for reasons that will be evident hereafter. The exhaust and fluid supply may be connected with the cylinder 40 in any suitable manner, such as by pipes 62 and 63. Any suitable means for example a pump 110, may be employed for placing under pressure, the fluid used with machines embodying my invention, valve 111 may control the operation of the pistons.

The piston 44 is used for reciprocating a knife or cut off plate 70 that moves in suitable ways provided in the housing 71 supported by the sides 8 and 9. The housing has formed in it a chamber 72 in which chamber is contained a plunger 73 carried by piston rod 43. The chamber 72 may communicate with the lower end of the way 74 extending through the hopper 75. The knife 70 controls communication between the way 74 and chamber 72. A drum 76 mounted for oscillation carries reciprocating plungers 77 contained in pockets 78. The pockets may be brought into registration with the chamber 72 and may receive charges of dough from said chamber. The drum is oscillated by means of a link 79 having its one end mounted eccentrically and rotatably on the gear 17 and having it other end pivotally mounted on a crank 80 mounted coaxially with the drum. The plungers 77 carried by the drum are moved to the left in the chamber 78, see Fig. 1, by the dough entering from chamber 72. The housing 71 is provided with an arcuate face that engages the drum and serves to seal the pockets as the drum moves the pockets from registration with the chamber 72. The drum is adapted to discharge dough from the pockets 78 onto the belt 81 extending below the drum. The belt 81 passes about the rollers 29 and 82 and discharges onto a belt 83 that may be disposed at one side of the device and that may pass about roller 31. The plungers 77 are moved in the drum by the action of the plunger 73 on the dough contained within the chamber 72. After the pockets each have a charge of dough the drum is moved about its axis so as to dispose the mouths of the pockets over the belt 81. The dough is discharged from the pockets by the engagement of a roller 200 on a stop bar 201 fixed on the hopper. The roller 200 is carried by a roller arm 207 fixed on a shaft 88 which shaft is pivotally supported by brackets 203. The brackets 203 are fixedly mounted on the drum 76. The shaft 88 has fixedly mounted on it a sleeve 204 carrying arms 202. Each arm 202 carries at its upper end a cross bar 210 that carries a pair of rollers 211, one each of which engages a screw 205, one one each of which screws is carried by one of each of the plungers 77. The sleeve 204 carries a fork 89 having a bifurcated upper end. The branches 90 of the fork receive between them the adjustment screw 91. The adjustment screw has its one end connected with the drum 76 and has an adjustment nut 92 mounted at its other end. The drum may be provided with a way as shown at 93 for receiving the first mentioned end of screw 91, the screw having a peripheral or annular groove 94 that receives the walls 95 of the way 93. A transverse pin 96 carried by the branches 90 of the fork is provided with a bore through which the screw 91 may slide. The relative adjustment of the screw 91 and the nut 92 controls the general adjustment of all of the plungers 77. The plungers 77 are individually adjustable by means of adjustable screw bolts 205 of which one is mounted on each plunger 77 and a transverse bar 210 carried by the arms 202 and which bar 210, the screws 205 may engage. From the foregoing it will be evident that when the screws 205 engage the bar 210 the movement of the plungers is arrested thereby limiting the capacity of the pockets and that when the drum is actuated to bring the roller 200 into engagement with the stop bar 201 the shaft 88 and the arms 202 are actuated for moving the plungers 77 outwardly of the drum thereby discharging the contents of the pockets 78.

The hopper has at its upper end a peripheral pocket 101 that may contain an edible oil that is fed over the inside walls of the hopper for precl ding adhesion of dough on the hopper and for facilitating the movement of dough through the hopper. The oil is fed to the walls of the hopper by means of revoluble rolls 102 that lie in the pocket 101 and are engaged by scrapers 103 from which scrapers the oil gravitates over the hopper wall. The rolls carry intermeshing bevel gears at their ends, and one roll carries in addition a ratchet wheel 104 that is engaged by a pawl 105 oscillated from the drum 76 in any suitable manner, for example as shown herein, by means of the rod 150 having a pivotal eccentric mounting on the drum and carrying the pawl. The top of the pocket 101 is closed by the peripheral lid 106 having a depending peripheral flange 107 that precludes dough from entering the pocket 101. The scrapers 103 discharge on the hopper wall below the flange 107.

The operation of my device is as follows: The dough in the hopper 75 may slide downwardly through the hopper into the chamber 72. The knife 70 is first moved to its right hand limit of travel whereupon the plunger 73 is moved to its right hand limit of travel, see Fig. 1. This order is followed so that the movement of the plunger will serve to draw dough into the chamber 72. The action of the cams controlling the pistons within the cylinder 40 is such that the knife 70 is first moved to the left for severing the dough in the hopper from the dough in the chamber 72, whereupon the plunger 73 is moved to the left thereby pushing the dough from the chamber 72 into the pockets in the drum 76, and thereby moving the plugers 77 inwardly of the drum. The drum 76 is then actuated about its axis so as to bring the pockets in the drum beyond the chamber 72, this action being utilized to sever the dough in the pockets in the drum from dough that may still be contained in the chamber 72. This movement of the drum is also utilized for actuating the ratchet mechanism employed for feeding the lubricating oil from the pocket 101 over the scrapper 103 to the inside walls of the hopper. The movement of the drum about its axis is also employed in effecting discharge of the pockets in the drum. By means of the yoke 89 and the adjustment screw 91 and the adjustment collar or nut associated with said screw it is possible to generally adjust the stroke of all of the plungers 77 at one time while fine individual adjustment of said plungers is made by screws 205, thereby giving substantially uniform weight to all of the lumps of dough discharged or divided by the several pockets 78 and their associated mechanisms. After the dough has been discharged from the pockets 78 the drum is moved in a counter clock-wise direction for bringing the pockets again into communication with the chamber 72. In the meanwhile the knife 70 has been drawn to the right whereupon the plunger 73 is drawn to the right and more dough may feed from the hopper into the chamber 72. By lubricating the inside walls of the hopper the movement of the dough through the hopper is made prompt and speedy. The by-pass 60 permits modification of the pressure that is directed upon the dough contained in the chamber 72 for moving such dough into the pockets 78. It will be readily evident from the disclosure herein that although but one by-pass is shown it is possible to extend this idea for giving various desired pressures under which the dough is to be worked.

The valve 111 may close off communication between the fluid pressure and the cylinder 40 whereby to render the device stationary, during such periods the fluid under pressure would pass through relief valve 300 and by-pass 301. The relief valve 300 also controls the maximum pressure that may be directed upon the dough in chamber 72.

What I claim is:

1. In a device of the class described the combination of a cylinder, a fluid pump connected with the cylinder, a pair of pistons reciprocally contained within the cylinder, a housing having a chamber formed therein, a plunger reciprocally contained within the chamber and connected with one of the pistons, a hopper, a reciprocating knife carried by the housing controlling communication between the hopper and the chamber and connected with the second piston, a drum having a pocket, the drum being movable relatively to the chamber for bringing the pocket in and out of registration with the chamber, a plunger within the pocket, and means for actuating the drum and the plunger within the pocket for alternately receiving dough in the pocket, from the chamber and for discharging the pocket.

2. In a device of the class described the combination of a pair of fluid actuated pistons, a housing having a chamber therein, a hopper for communication with the chamber, a plunger within the chamber and connected with one of the pistons, a knife connected with the second piston and controlling communication between the hopper and the chamber, an oscillating drum associated with the housing and having a pocket for intermittent registration with the chamber, a reciprocating plunger in the pocket, means for oscillating the drum and for controlling the movement of the pistons, and means associated with the drum and the plunger in the pocket for discharging the pocket when the pocket is out of registration with the chamber.

3. In a device of the class described the combination of a pair of fluid actuated pistons, a housing having a chamber therein, a hopper for communication with the chamber, a plunger within the chamber and connected with one of the pistons, a knife connected with the second piston and controlling communication between the hopper and the chamber, an oscillating drum associated with the housing and having a pocket for intermittent registration with the chamber, a reciprocating plunger in the pocket, means for oscillating the drum and for controlling the movement of the pistons, means associated with the drum and the plunger in the pocket for discharging the pocket when the pocket is out of registration with the chamber and means for controlling the stroke of the piston associated with the plunger within the chamber.

4. In a device of the class described the combination of a pair of fluid actuated pistons, a housing having a chamber therein, a hopper for communication with the chamber, a plunger within the chamber and connected with one of the pistons, a knife connected with the second piston and controlling communication between the hopper and the chamber, an oscillating drum associated with the housing and having a pocket for intermittent registration with the chamber, a reciprocating plunger in the pocket, means for oscillating the drum and for controlling the movement of the pistons, means associated with the drum and the plunger in the pocket for discharging the pocket when the pocket is out of registration with the chamber and means for cushioning the strokes of the pistons.

5. In a device of the class described the combination of a pair of fluid actuated pistons, a housing having a chamber therein, a hopper for communication with the chamber, a plunger within the chamber and connected with one of the pistons, a knife connected with the second piston and controlling communication between the hopper and the chamber, an oscillating drum associated with the housing and having a pocket for intermittent registration with the chamber, a reciprocating plunger in the pocket, means for oscillating the drum and for controlling the movement of the pistons, means associated with the drum and the plunger in the pocket for discharging the pocket when the pocket is out of registration with the chamber, means for controlling the stroke of the piston associated with the plunger within the chamber and means for cushioning the strokes of the pistons.

6. In a dough working machine the combination of a hopper having depending walls and having an opening at its top, a pocket extending about the hopper opening adapted to receive an edible lubricant, a roller within the pocket, a scraper engaging the roller for receiving lubricant from the roller and for discharging the lubricant upon the wall of the hopper and means for rotating the roller.

7. In a dough working machine the combination of a hopper having an opening, a pocket extending about the opening adapted to receive an edible lubricant, and a rotating roller contained within the pocket for discharging the lubricant from the pocket into the hopper.

8. In a dough working machine the combination of a hopper having side walls and an opening in its top, a pocket extending about the hopper opening adapted to receive an edible lubricant, a roller within the pocket adapted to contact the lubricant and to carry the lubricant on its surface, means for transferring the lubricant from the surface of the roller to the side walls of the hopper, and means for rotating the roller.

9. In a device of the class described the combination of a pair of fluid actuated pistons, a housing having a chamber formed therein, a plunger within the chamber and connected with one of the pistons, a hopper, a knife controlling communication between the hopper and the chamber and connected with the second piston, a drum having a pocket, the drum being movable relatively to the chamber, a plunger within the pocket, and means for actuating the drum and the plunger within the pocket for alternately receiving dough in the pocket from the chamber and for discharging the pocket.

In testimony whereof, I have hereunto subscribed my name this 22nd day of February, 1924.

WILLIAM G. KIRCHHOFF.